Dec. 29, 1942.   M. ESSL   2,306,990
SEALING ARRANGEMENT FOR LOCOMOTIVE POWER UNITS
Filed Feb. 12, 1941   2 Sheets-Sheet 1
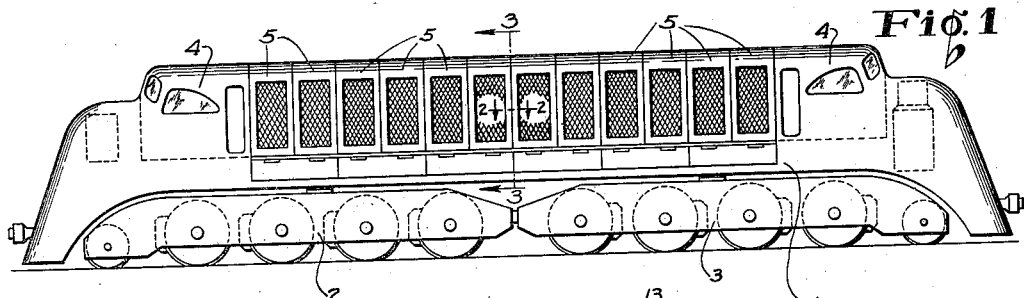
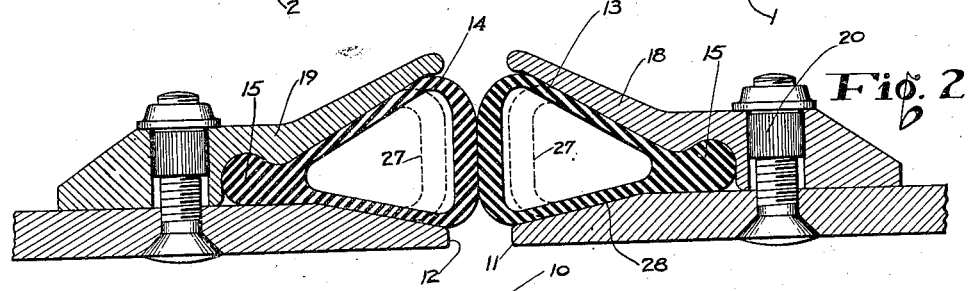
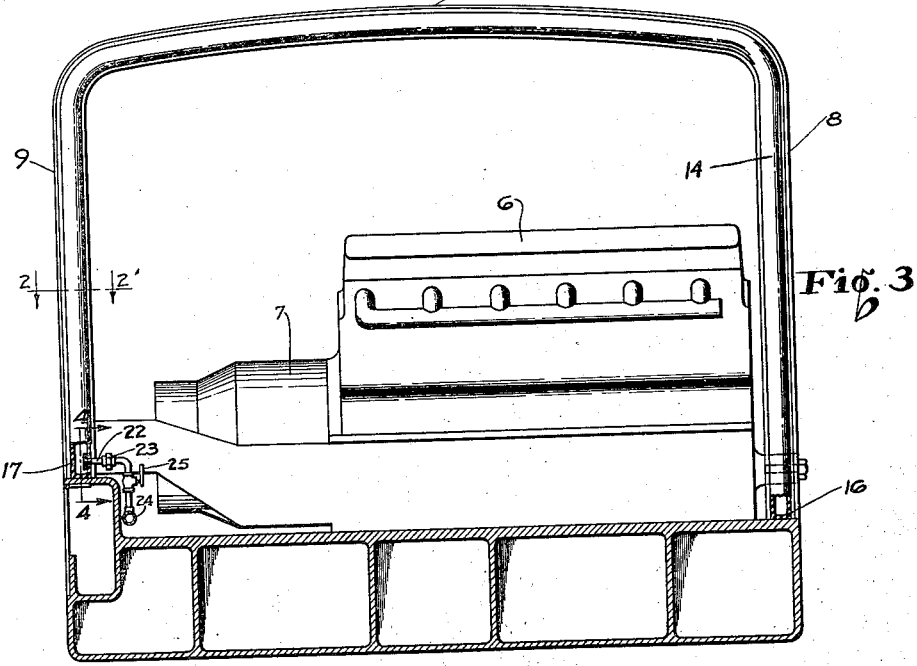
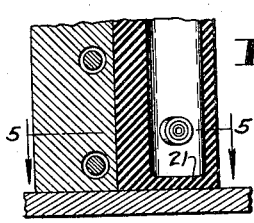
INVENTOR
Max Essl
BY
ATTORNEY Dec. 29, 1942.   M. ESSL   2,306,990
SEALING ARRANGEMENT FOR LOCOMOTIVE POWER UNITS
Filed Feb. 12, 1941    2 Sheets-Sheet 2

INVENTOR
Max Essl
BY
ATTORNEY

Patented Dec. 29, 1942

2,306,990

UNITED STATES PATENT OFFICE 2,306,990

SEALING ARRANGEMENT FOR LOCOMOTIVE POWER UNITS

Max Essl, Lansdowne, Pa., assignor to The Baldwin Locomotive Works, a corporation of Pennsylvania Application February 12, 1941, Serial No. 378,541

11 Claims. (Cl. 105—35)

This invention relates generally to locomotives of the type employing a plurality of removable power units and more particularly to improved means whereby the hoods for adjacent power units may be adequately sealed against outside atmospheric conditions.

In locomotives of the general type disclosed herein such as shown in my copending application Serial No. 258,689, filed February 27, 1939, a plurality of power units are provided each including an internal combustion engine and an electric generator at one end thereof and relatively closely spaced in side by side relation with the power units extending transversely of the locomotive frame. Each of these power units is individually removable together with a hood section usually comprising both side and roof hood sections, the hood sections of the successive units forming a continuous outside surface when placed in contiguous relation to each other. It is necessary, however, to have the adjacent edges of the hood sections sufficiently spaced apart to allow a unit to be bodily lifted or moved sidewise from the locomotive frame and yet it is essential that this space should be closed to prevent rain, snow, wind or other adverse atmospheric conditions from entering the interior of the locomotive.

It is an object of my invention to provide improved means whereby the spacing between adjacent hood sections may be quickly and effectively closed or opened thereby facilitating easy and prompt removal or replacement of a power unit in case it is necessary to repair a unit.

A further object is to provide improved means for sealing and unsealing the space between adjacent hood sections without danger of damaging adjacent edges of the hoods. Another object is to provide an improved sealable means that can be readily accommodated to a curved surface such as a roof section of the hoods.

A still further object is to provide improved sealable means that may be effectively supported in position adjacent the edges of the hoods in a simple and economical manner while still maintaining complete freedom of action of the sealable means.

Other objects and advantages will be more apparent to those skilled in the art from the following description of the accompanying drawings in which:

Fig. 1 is a side elevation of the type of locomotive in which my improved sealable means is employed;

Fig. 2 is a horizontal section taken on the line 2—2 of Figs. 1 and 3;

Fig. 3 is a transverse section taken on the line 3—3 of Fig. 1;

Fig. 4 is an enlarged vertical section taken on the line 4—4 of Figs. 3 and 5 showing a closed end of the sealing tube;

Fig. 5 is a horizontal section taken on the line 5—5 of Fig. 4; and

Figure 6:
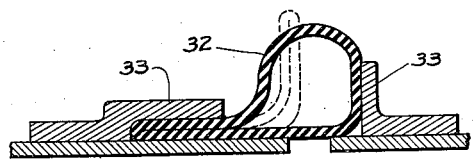
Figs. 6 to 12 are modified forms of sealing tubes that may be employed in my invention.

In the drawings of Fig. 1 I have shown a locomotive of the type having a cab underframe 1 preferably supported on a pair of articulated power trucks diagrammatically indicated at 2 and 3 whose axles are driven through usual electric motors. An operator's cab 4 may be located at each end of the locomotive while a space between said cabs is provided with a series of power units generally indicated at 5. These power units are generally of the type shown in my above mentioned copending application and each comprises, as shown in Fig. 3, an engine 6 having a generator 7 at one end thereof. The engine generator power units are arranged with the engine crankshaft axes extending transversely of the frame and the successive units are placed in relatively close side by side relation to each other thereby forming a longitudinally compact bank of units. Each unit is provided with its own hood section including surfaces such as side sections 8 and 9 and a roof section 10. As shown in Fig. 2, the adjacent edges 11 and 12 of the adjacent power unit hoods are sufficiently spaced apart so that any power unit together with its hood may be bodily removed from or replaced on the locomotive frame. The space between the adjacent hood sections is preferably sufficient so as to avoid injury to the hoods through hitting each other during removal or replacement of a unit. Regardless, however, of the extent of spacing between the hood sections, it is essential that the adjacent edges be adequately closed preferably by a reasonably tight seal so as to prevent rain, wind, snow or other elements from entering the locomotive. Also, it is desirable that any sealing means should be easily, quickly and effectively operated without undue loss of time.

To accomplish the foregoing and still other desirable characteristics I have provided in one specific aspect of the invention, as shown in Fig. 3, a pneumatically inflatable seal including a pair of tubes 13 and 14 of substantially triangular shape in cross-section and having a bulbous end 16. This tube extends preferably, as shown in Fig. 3, from one end 16 vertically along side 8 and across top 10 and along side 9 terminating at its other end 17. The pair of tubes of adjacent sections are clamped to their respective hoods by clamping strips 18 and 19 extending preferably entirely along the full length of the tubes between their ends 16 and 17 and being held in position by a series of bolts, rivets or other suitable holding means 20. Both ends of the tubes are closed as shown in Fig. 4 at 21. An air inlet pipe 22, Fig. 3, is suitably connected into each tube adjacent one end such as 17 while a quick detachable coupling 23 connects pipe 22 to an air pressure supply pipe 24 running lengthwise of the locomotive frame to serve each of the tubes. Each branch from pipe 24 may be provided with a three-way valve 25 to admit air to or discharge air from the tubes individually.

When air pressure is admitted to each of the tubes through valve 25 the tubes expand toward each other as shown in Fig. 2 until coming into contact at substantially a middle position, although when the air pressure is released the elastic qualities of the tube which are preferably rubber will cause the same to retract to the dotted line positions 27 thereby providing adequate space between the adjacent sections for complete freedom for removal or replacement of a unit. Any irregularities in the hoods will be compensated for by the flexibility of the adjustable seals while the inclined walls of the clamping strips 18 and the tapered edges 28 of the hoods insure a snug fit of the tubular seals and also the tapered hood surface 28 allows the tubes to more nearly approach the outer surface of the hood walls thereby forming a highly continuous appearance of the surface.

Figure 7:
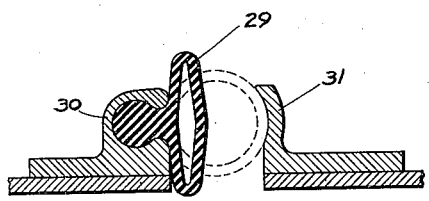

In the Fig. 7 modification a single tube 29 is secured in an integral holding strip 30 into which the bulbous end of the tube may be forced. When the tube 29 is expanded it seats against a semi-circular strip 31 formed on the adjacent hood. This arrangement allows one tube to be used to a power unit. As shown in Fig. 6, the tubular member 32 is normally a circular tube of uniform wall thickness held in position by merely clamping a portion of the tube upon itself as indicated at 33. The tube when expanded seats against an angle bar strip 33' which is preferably inset slightly from the edge of the hood wall.

Figure 8:
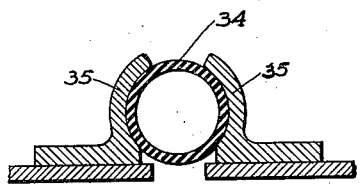
Figure 9:
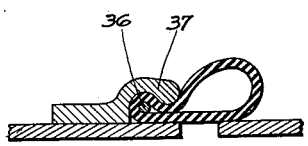

In Fig. 8 a single removable tube 34 is manually placed between two opposed semi-circular seating strips 35, although if desired the tube may be suitably glued within one of these seating strips. Fig. 9 shows a single tube of uniform wall thickness provided with a wire 36 disposed inside of a tube and held in position by an overhanging interlocking clamping strip 37 secured to the wall of the hood section. This tube may be expanded into overlapping contact with the adjacent roof section without having a seating strip thereon.

Figure 10:
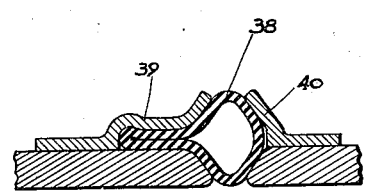

In Fig. 10 a single tube 38 of uniform wall thickness is clamped as at 39 and bears against an inclined seating arrangement 40 preferably of V-form.

Figure 11:
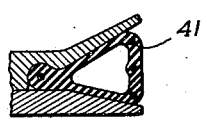
Figure 12:
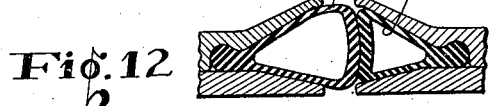

As shown in Fig. 11 the tubes employed in Fig. 2 may be provided with reinforcing wires 41 in the face of the tubes so that the wires do not interfere with the expansion of the tubes. Also, the form of tube shown in Fig. 2 serves the double purpose of being sealable whether one or both tubes are inflated. It may happen that one tube, such as 24, may become punctured and deflated whereupon the second tube 43 would be further expanded to maintain contact with tube 42 or with the pocket walls of the tube 42 thereby maintaining the complete sealing action.

From the foregoing disclosure of the several modifications, it is seen that I have provided an extremely simple, effective and readily operable sealable means for adjacent edges of the hood sections regardless of whether these sections are straight as along the vertical sides or whether the sections are curved as across the roof. The tubes when deflated allow adequate space between the adjacent edges of the hood walls thereby minimizing the possibility of damage to the hoods during removal or replacement of a unit but at the same time the tubes completely fill this space when the units are in position.

It will of course be understood that various changes in details of construction and arrangement of parts may be made by those skilled in the art without departing from the spirit of the invention as set forth in the appended claims.

I claim:

1. The combination in a locomotive of the type having a plurality of power units disposed in side by side relation to each other and removably supported on a frame mounted upon driving wheels comprising, a plurality of removable power unit hood sections for the respective power units, said hood sections having surfaces with edges adjacent to each other whereby the successive hood sections provide a continuous covering surface for all of the power units, and yieldable means interposed between said adjacent edges to seal the same.

2. The combination in a locomotive of the type having a plurality of power units disposed in side by side relation to each other and removably supported on a frame mounted upon driving wheels comprising, a plurality of hood sections for the respective power units and removable as a unit therewith, said hood sections having surfaces with edges adjacent to each other whereby the successive hood sections provide a continuous covering surface for all of the power units, and means movable in a direction across said adjacent edges to seal the same when the hood sections are in normal position and to unseal the same when a hood section is to be removed.

3. The combination in a locomotive of the type having a plurality of power units disposed in side by side relation to each other and removably supported on a frame mounted upon driving wheels comprising, a plurality of hood sections for the respective power units and removable as a unit therewith, said hood sections having surfaces with adjacent edges whereby the successive hood sections provide a continuous covering surface for all of the power units, and fluid operated means movable in a direction crosswise of said adjacent edges to seal the same and operable to unseal said adjacent edges when the fluid pressure is released.

4. The combination in a locomotive of the type having a plurality of power units disposed in side by side relation to each other and removably supported on a frame mounted upon driving wheels comprising, a plurality of hood sections for the respective power units and removable as a unit therewith, said hood sections having surfaces with adjacent edges whereby the successive hood sections provide a continuous covering surface for all of the power units, and a pneumatically controlled expansible tubular member interposed between said adjacent edges whereby upon expansion of said member the adjacent edges are sealed and upon contraction the edges are unsealed to allow removal of a hood section.

5. The combination in a locomotive of the type having a plurality of power units disposed in side by side relation to each other and extending transversely of and removably supported upon a frame mounted upon driving wheels comprising, a plurality of hood sections for the respective power units and removable as a unit therewith, said hood sections having surfaces with adjacent edges whereby the successive hood sections provide a continuous covering surface for all of the power units, one of said edges being provided with a yieldable sealing member and the other edge having a seat for said sealing member whereby upon engagement of said sealing member and seat the adjacent hood edges are sealed.

6. The combination in a locomotive of the type having a plurality of power units disposed in side by side relation to each other and extending transversely of and removably supported upon a frame mounted upon driving wheels comprising, a plurality of hood of hood sections for the respective power units and removable as a unit therewith, said hoods sections having surfaces with adjacent edges whereby the successive hood sections provide a continuous covering surface for all of the power units, and a yieldable sealing member disposed on the inside of one of said hood sections adjacent the edge thereof, and a seat formed on the other hood section adjacent its edge so as to be engaged by said sealing member.

7. The combination in a locomotive of the type having a plurality of power units disposed in side by side relation to each other and extending transversely of and removably supported upon a frame mounted upon driving wheels comprising, a plurality of hood sections for the respective power units and removable as a unit therewith, said hood sections having surfaces with adjacent edges whereby the successive hood sections provide a continous covering surface for all of the power units, and yieldable sealing means carried on each of said hoods adjacent said edges and operable to engage each other to seal said hoods together.

8. The combination in a locomotive of the type having a plurality of removable power units disposed in side by side relation to each other and extending transversely of a frame mounted upon driving wheels comprising, a plurality of hood sections respectively for said units, said hood sections having edges adjacent to each other when the power units are placed in said side by side relation, yieldable sealing members carried on each of said hoods adjacent said edges and operable to engage each other to seal said hoods together, and fluid pressure means for moving at least a portion of one of said members into and out of engagement with the other.

9. The combination in a locomotive of the type having a plurality of removable power units disposed in side by side relation to each other and extending transversely of a frame mounted upon driving wheels comprising, a plurality of hood sections respectively for said units, said hood sections having edges adjacent to each other when the power units are placed in said side by side relation, yieldable sealing members carried on each of said hoods adjacent said edges and operable to engage each other to seal said hoods together, and fluid operated means for moving at least a portion of both of said sealing members toward each other.

10. The combination in a locomotive of the type having a plurality of removable power units disposed in side by side relation to each other and extending transversely of a frame mounted upon driving wheels comprising, a plurality of hood sections respectively for said units, said hood sections having edges adjacent to each other when the power units are placed in said side by side relation, yieldable sealing members carried on each of said hoods adjacent said edges and operable to engage each other to seal said hoods together, and fluid operated means for moving at least a portion of both of said sealing members toward each other, said sealing members being so arranged that in the event one is not operated the other will move beyond its normal sealing position to maintain a sealing relation with the adjacent hood sections.

11. The combination in a locomotive of the type having a plurality of removable power units disposed in side by side relation to each other and extending transversely of a frame mounted upon driving wheels comprising, a plurality of power units each having an internal combustion engine provided with a crankshaft for driving a power converter at one end thereof, said power units being disposed in side by side relation to each other with their crankshaft axes extending transversely of said frame, each of said power units having an individual hood wall section, the edge of one hood section being adjacent to the edge of the next hood section thereby forming a substantially continuous hood surface, and means mounted on one of the adjacent hood sections and having a movable portion for sealing said adjacent edges when said power units are in their normal position and for unsealing said edges when a power unit is to be removed or replaced in the locomotive.

MAX ESSL.